E. WALKER.
TURNBUCKLE.
APPLICATION FILED MAY 10, 1916.
1,226,830.
Patented May 22, 1917.
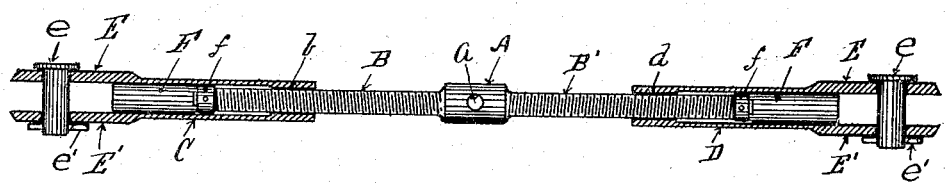
Inventor.
Edwin Walker
By J.C. & H. M. Sturgeon
attys.

UNITED STATES PATENT OFFICE.

EDWIN WALKER, OF ERIE, PENNSYLVANIA.

TURNBUCKLE.

1,226,830.  Specification of Letters Patent.  Patented May 22, 1917.

Application filed May 10, 1916. Serial No. 96,560.

*To all whom it may concern:*

Be it known that I, EDWIN WALKER, a citizen of the United States, residing at Erie, in the county of Erie and State of Pennsylvania, have invented certain new and useful Improvements in Turnbuckles; and I do hereby declare the following to be a full, clear, and exact description of the invention, such as will enable others skilled in the art to which it appertains to make and use the same, reference being had to the accompanying drawings, and to the letters of reference marked thereon, forming part of this specification.

This invention relates to improvements in turn-buckles for coupling and adjusting the tension of tie-rods, wires, wire ropes, and the like, of a type having a central section, provided centrally with means for rotating it, and with a right hand screw thread at one side, and a left hand screw thread at the other side of the central part thereof, combined with tubular end sections, provided at their inner ends with internal right and left hand screw threads adapted to engage the screw threads on the central section, and at their outer ends with means for coupling them to the rods, wires, etc., to be connected and tensioned by the turn-buckle.

Heretofore turn-buckles have been commonly constructed of a central sleeve section provided at its respective end portions with right and left hand internal screw threads extending nearly to the center of said sleeve portion, in which right and left hand threaded connecting rods operated. In this type of construction, however, the long internal screw threads in the sleeve are so difficult to make of equal diameter throughout their entire length, that the right and left hand screw threaded connecting rods, operating therein, will not fit the threads in the sleeve section alike, throughout, but will be loose at some points, and tight at others. Again, in operation, the ends of the connecting rods are liable to be unscrewed so nearly out of the ends of the sleeve section, without the knowledge of the operator, that the threads having too short an engagement will be stripped, and the connecting rods be drawn out of the sleeve.

The object of this invention is to so construct a turn-buckle, as to overcome both of these difficulties.

In doing this, I make the central section of the turn-buckle of a rod having a slightly enlarged center provided with a hole therethrough, or other means for rotating it, and this rod is provided with a right hand screw thread at one side of this central enlargement, and with a left hand screw thread at the other. The end sections are tubular in form, and provided at their outer ends with means for coupling them to the rods or wires to be tensioned, and at their inner ends with short internal screw threads, one right hand and the other left hand, to engage the right hand and left hand screw threads on the central section, and from the inner ends of these internal screw threads the tubular sections are counterbored to their outer ends, so that when the tubular sections are screwed upon the central section, collars can be secured to the ends of the central sections, fitting the counterbores of the end sections, so that the end sections cannot be unscrewed from the central section.

The outer ends of the end sections are preferably forked with a transverse pin passing therethrough, by means whereof they can be coupled to the wires, rods, etc., to be tensioned: but it is obvious that the outer ends of the end sections can be provided with any convenient form of coupling desired.

The invention will be readily understood from the description hereinafter contained, and by reference to the accompanying drawings, in which:—

The figure shows my improved turnbuckle with the end sections sectioned.

The central section of the turn-buckle shown in the figure consists of a rod provided with a central enlargement A, preferably provided with a transverse hole $a$, in which a transverse rod can be inserted to rotate it; but other means may be used for rotating the central section if desired.

This central section is provided with a right hand screw thread B at one side of the enlargement A, and with a left hand screw thread B' at the other side of the enlargement A. The end sections C and D, are preferably provided at their outer ends with forks E E', through which transverse pins e, pass, preferably secured in place by cotter-pins e' whereby the end sections C and D, can be coupled to wires, rods or other structures which it is desired to tension. The inner end of the section C, is provided with a short right hand internal screw thread b adapted to engage the right hand screw thread B, on the central section, and the inner end of the section D, with a short left hand internal screw thread d, adapted to engage the left hand screw thread B', on the central section, so that when the central section is screwed into the inner ends of the sections C and D, the continued rotation of the central section in the same direction will draw the sections C and D, toward each other until the inner ends of the sections C and D, contact with the central enlargement A, on the central section. The reverse rotation of the central section operates to move the sections C and D, apart.

From the inner ends of the internal screw threads b and d, in the inner ends of the sections C and D, I counterbore these sections to their outer ends, as at F F, so as to avoid cutting threads therein, and preferably on the ends of the central section, I secure collars f f, which fit the counterbores F F, and operate as stops when the sections C and D, are moved far enough apart so that the collars f f, engage the inner ends of the internal screw threads b and d, and prevents the ends of the central section from being unscrewed from the threads b and d, in the end sections.

These collars also operate as guides for the ends of the central section in the end sections C and D, maintaining the right and left screws at all times in exact axial alinement with the internal walls of the end portions C and D, thus insuring the rigidity of the structure and preventing the vibration of these parts with relation to each other.

Having thus described my invention so as to enable others to utilize the same, it is obvious that modifications can be made in the construction thereof, without departing from the spirit of the invention as defined by the scope of the appended claims; therefore what I claim as new, and desire to secure by Letters-Patent, is:—

1. The combination in a turn-buckle of a non-rotatable tubular end portion having a portion of its internal wall provided with raised screw-threads, a rod provided with screw-threads to engage the threads in said tubular end portion, and a guide on the end of said rod adapted to fit and move in the plain interior of said end portion, substantially as and for the purpose set forth.

2. The combination in a turn-buckle of a non-rotatable end portion having a longitudinal opening therethrough, in which there are provided internal screw-threads of less internal diameter than the unthreaded portion of said opening, a rotatable rod having screw-threads adapted to engage said internal threads, and a guide on said rod of a diameter at least equal to the outside diameter of the threads on said rod, substantially as and for the purpose set forth.

3. The combination in a turn-buckle of non-rotatable end portions having longitudinal openings therethrough having in the adjacent ends of said openings internal right and left screw-threads of less inside diameter than the diameter of the unthreaded portions thereof, a rotatable rod provided with right and left screw-threads to engage the threads in said end portions, and means on the ends of said rod to engage the unthreaded internal surfaces of said longitudinal openings to prevent lateral movement of said threaded parts, substantially as set forth.

In testimony whereof I affix my signature.

EDWIN WALKER.